United States Patent
Zhukov et al.

(10) Patent No.: US 9,112,940 B2
(45) Date of Patent: Aug. 18, 2015

(54) CORRELATING SENSOR INPUTS WITH CONTENT STREAM INTERVALS AND SELECTIVELY REQUESTING AND TRANSMITTING CONTENT STREAMS

(71) Applicant: VideoGorillas LLC, Walnut, CA (US)

(72) Inventors: Oleksandr Zhukov, Kiev (UA); Andrii Iakovenko, Kiev (UA)

(73) Assignee: VideoGorillas LLC, Walnut, CA (US)

( * ) Notice: Subject to any disclaimer, the term of this patent is extended or adjusted under 35 U.S.C. 154(b) by 0 days.

(21) Appl. No.: 14/472,323

(22) Filed: Aug. 28, 2014

(65) Prior Publication Data

US 2015/0149598 A1    May 28, 2015

Related U.S. Application Data

(60) Provisional application No. 61/908,253, filed on Nov. 25, 2013.

(51) Int. Cl.
| | |
|---|---|
| *H04N 7/00* | (2011.01) |
| *H04L 29/06* | (2006.01) |
| *H04L 29/08* | (2006.01) |
| *G06F 17/30* | (2006.01) |
| *G06F 3/01* | (2006.01) |

(52) U.S. Cl.
CPC .............. *H04L 65/60* (2013.01); *G06F 3/011* (2013.01); *G06F 17/30837* (2013.01); *H04L 29/06448* (2013.01); *H04L 67/10* (2013.01)

(58) Field of Classification Search
CPC .............. H04L 29/06448; H04L 29/06482; H04L 65/4069; G06F 17/30837–17/30852; G06F 31/011–31/016
USPC .......................................... 709/217–219, 232
See application file for complete search history.

(56) References Cited

U.S. PATENT DOCUMENTS

| | | | |
|---|---|---|---|
| 8,165,450 B2 | 4/2012 | Casagrande | |
| 2005/0071058 A1 | 3/2005 | Salande, Jr. | |
| 2006/0284978 A1* | 12/2006 | Girgensohn et al. | 348/143 |
| 2006/0288288 A1* | 12/2006 | Girgensohn et al. | 715/716 |
| 2011/0162029 A1* | 6/2011 | Huang et al. | 725/123 |
| 2013/0311595 A1 | 11/2013 | Milatinovici et al. | |
| 2013/0330055 A1* | 12/2013 | Zimmermann et al. | 386/240 |
| 2013/0336627 A1* | 12/2013 | Calvert | 386/224 |
| 2013/0336628 A1* | 12/2013 | Lamb et al. | 386/224 |
| 2014/0192200 A1* | 7/2014 | Zagron | 348/159 |
| 2014/0267904 A1* | 9/2014 | Saboune et al. | 348/460 |

OTHER PUBLICATIONS

GoLive, Startup Pitch and Concept Movie—MITx Enterpreneurship Bootcamp, YouTube https://www.youtube.com/watch?v=1Nps4pAMmqk.

* cited by examiner

*Primary Examiner* — Brendan Higa
(74) *Attorney, Agent, or Firm* — Lowenstein Sandler LLP; Ariel Reinitz

(57) ABSTRACT

Systems and methods are disclosed for correlating sensor inputs with content stream intervals and selectively requesting and transmitting content streams. In one implementation, a processing device receives a content stream from a media capture device. The processing device correlates one or more chronological intervals of the content stream with one or more first inputs, the one or more first inputs originating from one or more sensors. The processing device processes the one or more first inputs to identify an incidence of one or more phenomena. Based on an identification of the incidence of the one or more phenomena, the processing device selects at least one of the one or more chronological intervals of the content stream that correspond to the one or more phenomena.

25 Claims, 7 Drawing Sheets

CORRELATING SENSOR INPUTS WITH CONTENT STREAM INTERVALS AND SELECTIVELY REQUESTING AND TRANSMITTING CONTENT STREAMS

CROSS-REFERENCE TO RELATED APPLICATION

This application is related to and claims the benefit of U.S. Patent Application No. 61/908,253, filed Nov. 25, 2013, the entirety of which is incorporated herein by reference.

TECHNICAL FIELD

Aspects and implementations of the present disclosure relate to data processing, and more specifically, to correlating sensor inputs with content stream intervals and selectively requesting and transmitting content streams.

BACKGROUND

Audio and video content can be captured and stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a content stream from a media capture device. The processing device correlates one or more chronological intervals of the content stream with one or more first inputs, the one or more first inputs originating from one or more sensors. The processing device processes the one or more first inputs to identify an incidence of one or more phenomena. Based on an identification of the incidence of the one or more phenomena, the processing device selects at least one of the one or more chronological intervals of the content stream that correspond to the one or more phenomena.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
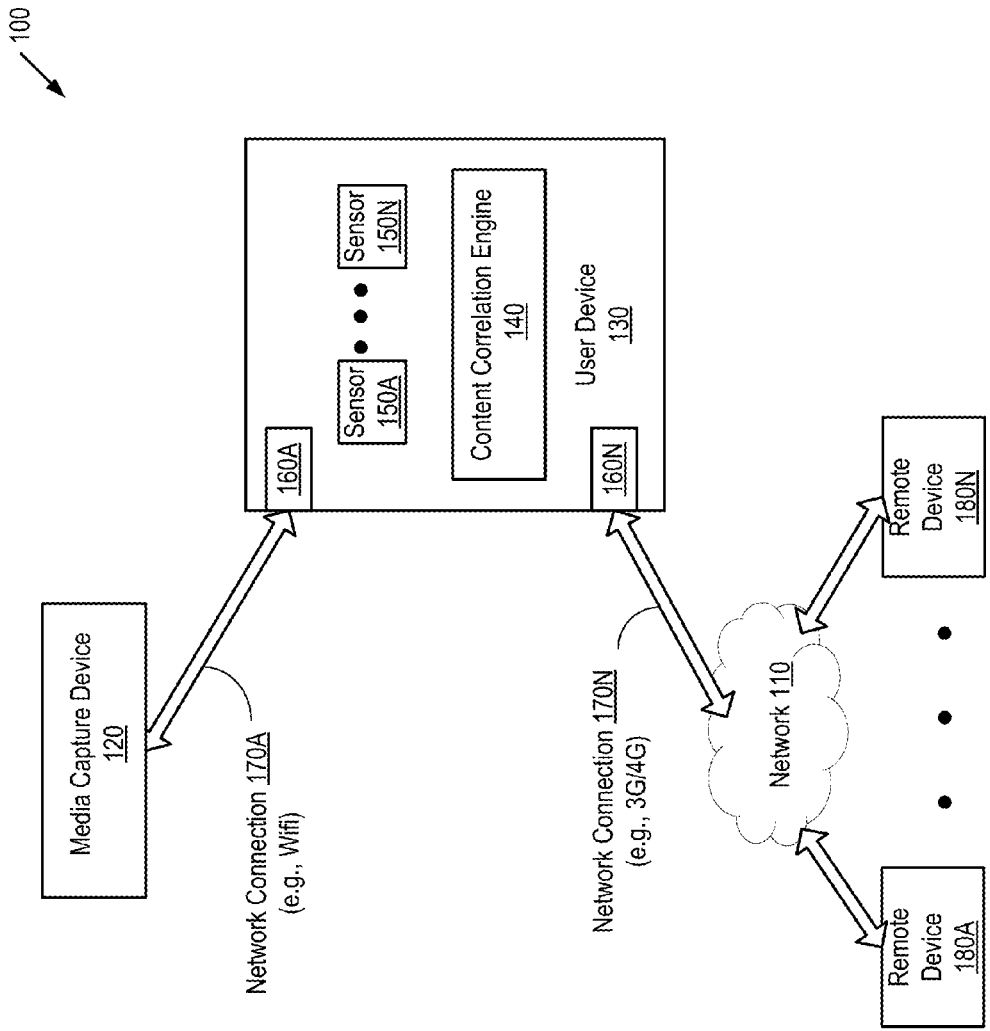
FIG. 1 depicts an illustrative system architecture, in accordance with one implementation of the present disclosure.

Aspects and implementations of the present disclosure are directed to correlating sensor inputs with content stream intervals and selectively requesting and transmitting content streams. The systems and methods disclosed can be applied to media content/streams such as audio and/or video content, images, and/or any other content or data that can be collected and/or disseminated such as via a media sharing/streaming service or website. More particularly, many media capture devices, such as video cameras, enable users to capture media content. Due to the proliferation of such devices, huge quantities of media content are constantly being captured, despite the fact that only a small percentage of such content is likely to be of interest to others. This is particularly true in scenarios/settings such as 'extreme sports' (e.g., skydiving, skiing, racing, race car driving, etc.) in which many participants wish to record their experiences in order to relive/review them later and/or share them with others. In such 'extreme sports' settings, the participant often has his/her hands occupied, and thus may be required to set the media capture device to 'record' well in advance of the actual moment(s) that the participant is interested in capturing (e.g., the 'freefall' portion of a skydive), and, for the same reason may need to leave the device in 'record' mode far after the moment(s) that the participant is interested in recording have passed.

While technologies do exist to enable participants to edit such videos after-the-fact, such tools can be expensive, difficult to use, and entail considerable further time investment. Additionally, the fact that such videos include a considerable amount of footage that is not of interest to the participant (and, presumably, other viewers as well) also results in such videos being poor candidates for live streaming (which would otherwise enable viewers to view them in real-time, as they are being captured). This challenge is further underscored by the fact that many popular cameras that are used to record videos in 'extreme sports' settings are also not capable of live streaming.

Accordingly, described herein in various embodiments are technologies that enable correlating sensor inputs with content stream intervals and selectively requesting and transmitting content streams. For example, as described herein, a content stream (e.g., a video stream) may be recorded by an external camera and streamed to a user device, such as a smartphone, via WiFi. Concurrent with receiving the content stream, the user device (e.g., the smartphone) can also receive various inputs, such as from various sensors embedded within the device (e.g., accelerometer, GPS receiver, etc.). The received sensor inputs can be correlated with respective chronological intervals of the video stream that are received at the same time. In doing so, various phenomena (e.g., rates of change or patterns) identified in relation to the sensor inputs (reflecting, for example, the 'freefall' portion of a skydive) can be associated with the chronological interval(s) of the received video stream to which they correspond. In doing so, those portions/intervals of a video stream that are determined to be likely to be of interest to a user/viewer (based on the identification of the referenced phenomenon, reflecting, for example, that the video is being captured while in 'freefall') can be recorded, transmitted (e.g., streamed in real-time), etc., while other intervals which do not correspond to the same phenomenon may not be transmitted, recorded, etc.

FIG. 1 depicts an illustrative system architecture 100, in accordance with one implementation of the present disclosure. The system architecture 100 includes media capture device 120, user device 130 and remote devices 180A-180N. These various elements or components can be connected to one another, whether via direct connection and/or via network 110, which can be a public network (e.g., the Internet), a private network (e.g., a local area network (LAN) or wide area network (WAN)), or a combination thereof.

Media capture device 120 can be a device (or devices) capable of capturing one or more forms of media, including but not limited to audio content, video content, images, etc. Examples of such a media capture device include video cameras, such as those that are configured for attachment/mounting to various surfaces (e.g., to helmets, vehicles, etc.), such as in order to capture video while a user is engaging in various activities or 'extreme sports' (e.g., biking, skiing, driving, skydiving, etc.). Media capture device 120 can also include a memory/storage device (e.g., flash memory, solid state disk, and/or any other such storage device) on which video/media capture by the device can be stored. Additionally, in certain implementations, media capture device 120 can incorporate one or more communication interfaces (e.g., WiFi, Bluetooth, USB, etc., adapters) through which media stored on the media capture device can be transmitted, such as to another device (e.g., a mobile device, personal computer, etc.), such as in order to view, edit, and/or disseminate the captured media.

User device 130 can be a rackmount server, a router computer, a personal computer, a portable digital assistant, a mobile phone, a laptop computer, a tablet computer, a camera, a video camera, a netbook, a desktop computer, a wearable computing device, a media center, any combination of the above, or any other such computing device capable of implementing the various features described herein. In certain implementations, user device 130 can enable a user, such an individual to interact with one or more services (e.g., media sharing/streaming services, social networks, etc.) such as in order to view and/or or otherwise interact with various media content items, content streams, and/or related content. Additionally, user device 130 may run an operating system (OS) that manages hardware and software of the user device 130. Various applications, such as mobile applications ('apps'), web browsers, etc. (not shown) may run on the user device (e.g., on the OS of the user device). Such applications can, for example, enable a user to capture media content (e.g., an audio clip/stream, a video clip/stream, etc.), provide media content (e.g., upload/stream media content to a central server and/or transmit it to another user), receive media content (e.g., via network 110), and/or view, display, or otherwise present media content (e.g., playing a video, listening to a song, etc.), such as via the user device 130.

In certain implementations, user device 130 can include and/or otherwise incorporate one or more communication interfaces 160A-160N. Such communication interfaces can be one or more elements or components that enable the device 130 to communicate with one or more other systems, machines, etc., such as by using one or more communication protocols to establish one or more connections 170A-170N. Examples of such communication interfaces include but are not limited to WiFi (i.e., 802.11), 3G/4G cellular, Bluetooth, etc. It should also be noted that, as described herein, device 130 and the various communications interfaces 160 can be configured such that content (e.g., a video stream) may be received/transmitted via a first communication interface (e.g., a WiFi adapter) and transmitted/received via a second communication interface (e.g., a 3G/4G cellular radio). In certain implementations, content correlation engine 140 may also process the received content prior to transmitting it (e.g., in order to compress the received content to facilitate transmission to remote devices).

User device 130 can also include, incorporate, and/or otherwise be configured in communication with one or more sensors 150A-150N. Examples of such sensors include but are not limited to: a global positioning system (GPS) receiver, an accelerometer, a gyroscope, an altimeter, a pressure sensor, a microphone, and a compass. In various implementations, such sensors can be integrated within user device 130 itself and/or can be attached/linked, such as in the case of peripheral devices. Such sensors can generate and/or provide inputs (which can be received, for example, by content correlation engine 140) based on the perception/occurrence of various events, occurrences, phenomena, etc. For example, a GPS receiver can provide inputs (e.g., coordinates) that reflect a geographic location of device 130 (and/or changes thereto), an accelerometer can provide inputs that reflect changes in acceleration, etc., such as in a manner known to those of ordinary skill in the art. It should be understood that, in certain implementations, the referenced inputs may be the product or result of one or more sampling techniques which are applied to signals or data originating at the referenced sensors, such as in a manner known to those of ordinary skill in the art. It should also be understood that, as used herein, the term 'phenomena' can refer to one or more events, occurrences, conditions, etc. (e.g., real-world events, occurrences, conditions, etc.) such as those that can be characterized, identified, and/or determined based on various inputs that can be generated by/received from one or more sensors, such as sensors that are configured to perceive various events, occurrences, or conditions. By way of illustration, one such phenomenon can be the occurrence of 'freefall' (e.g., during skydiving) which can be identified, for example, based on inputs from one or more sensors (e.g., altimeter, accelerometer, etc.) which can be processed to determine a change in altitude (e.g., at a particular time/over a particular timeframe). By way of further illustration, another such phenomenon can be the occurrence of acceleration or traveling at a particular speed (e.g., during driving/racing) which can be identified, for example, based on inputs from one or more sensors (e.g., GPS, accelerometer, etc.) which can be processed to determine a change in acceleration and/or a speed (e.g., at a particular time/over a particular timeframe). It should be further understood that such illustrations are exemplary and that any number of other phenomena can also be identified, based on any number of different inputs (and/or combinations/composites thereof).

User device 130 can also include components such as content correlation engine 140. In certain implementations, content correlation engine 140 can correlate various intervals of a content stream (e.g., a video stream, such as may be received from media capture device 120) with various inputs received from sensors 150. Such inputs can be correlated with the content stream, for example, based on an observed/identified synchronicity between the input(s) and respective intervals of the content stream (e.g., based on an input having a timestamp that corresponds to the timestamp of a particular point/interval of the content stream). In doing so, various phenomena that may be identified, for example, based on/in relation to inputs originating from the referenced sensors can, in turn, be associated with intervals in the content stream that chronologically correspond (that is, are synchronous with) to such phenomena, thereby enabling such intervals to be highlighted, selected, transmitted, etc. (e.g., to remote users/viewers) based on inputs/phenomena which may not be present or otherwise identifiable within the originally generated content stream (e.g., at media capture device 120). As noted, in certain implementations, such operations can be performed by and/or in conjunction with content correlation engine 140.

It should also be understood that the components referenced herein can be combined together or separated into further components, according to a particular implementation. Additionally, in some implementations, various components of user device 130 may run on separate machines. Moreover, some operations of certain of the components are described in more detail below with respect to FIG. 2.

Remote devices 180A-180N can be one or more rackmount servers, router computers, personal computers, portable digital assistants, mobile phones, laptop computers, tablet computers, cameras, video cameras, netbooks, desktop computers, media centers, any combination of the above, or any other such computing device(s) capable of implementing the various features described herein. In certain implementations, remote devices 180 can enable a user/viewer, such an individual to interact with one or more services (e.g., media sharing/streaming services, social networks, etc.) such as in order to view and/or or otherwise interact with various media content items, content streams, and/or related content. For example, as described herein, a user of a remote device 180 may provide/specify various phenomena with respect to which the user wishes to receive (or be notified of) corresponding content streams (e.g., video streams captured concurrent with such phenomena). By way of illustration (and as is described in greater detail herein), a user/viewer may select to receive (or be notified of) video streams that are captured in conjunction with various acceleration patterns (e.g., high speed driving videos), changes in altitude (e.g., skydiving videos), etc. (e.g., based on the various correlated sensor inputs, as described herein). Additionally, remote device(s) 180 may run an operating system (OS) that manages hardware and software of the remote device. Various applications, such as mobile applications ('apps'), web browsers, etc. (not shown) may run on the remote device (e.g., on the OS of the remote device). Such applications can, for example, enable a user to capture media content (e.g., an audio clip/stream, a video clip/stream, etc.), provide media content (e.g., upload/stream media content to a central server and/or transmit it to another user), receive media content/streams (e.g., via network 110), and/or view, display, or otherwise present media content/streams (e.g., playing a video, listening to a song, etc.), such as via the remote device 180.

Figure 2:
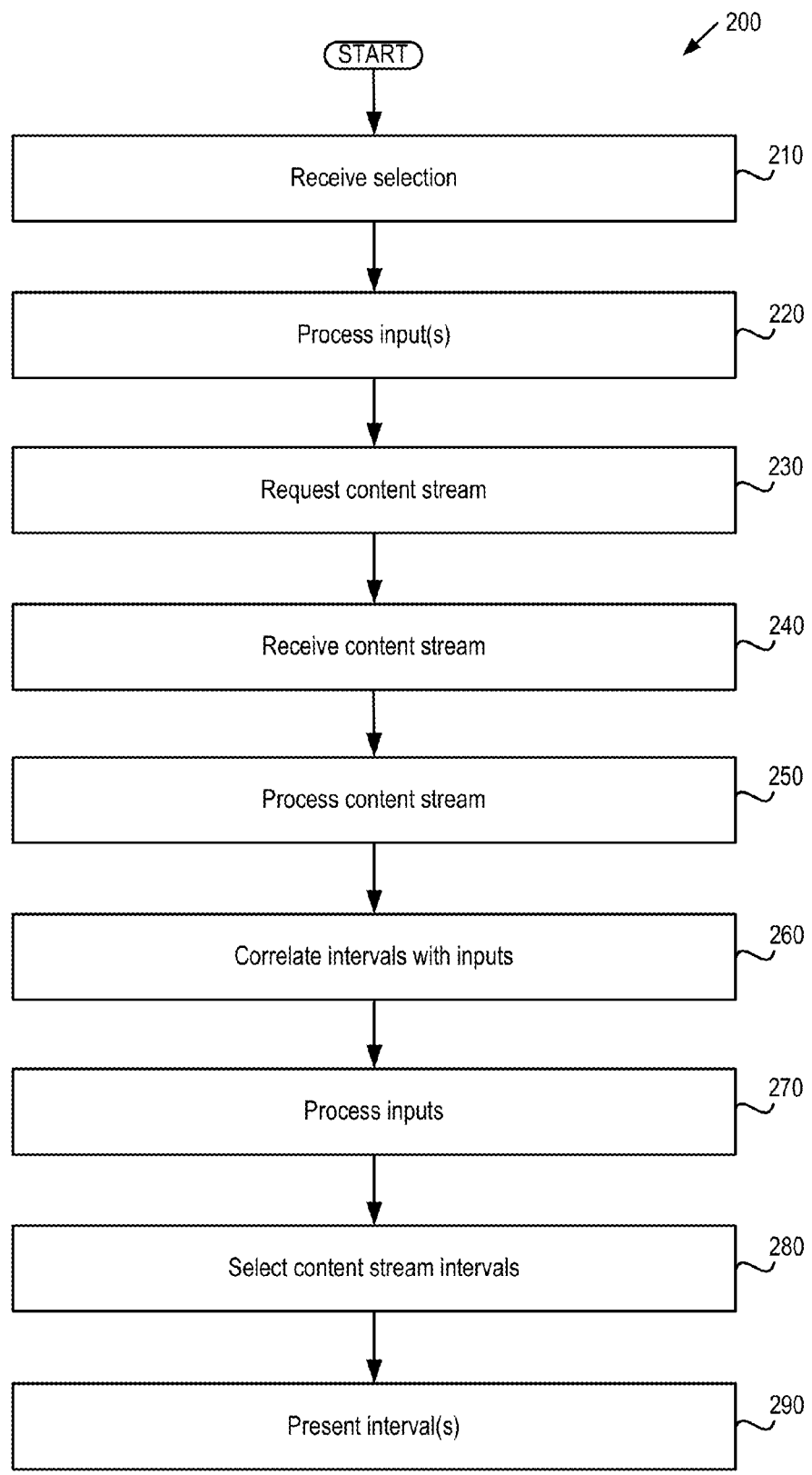
FIG. 2 depicts a flow diagram of aspects of a method for correlating sensor inputs with content stream intervals and selectively requesting and transmitting content streams.

FIG. 2 depicts a flow diagram of aspects of a method 200 for correlating sensor inputs with content stream intervals and selectively requesting and transmitting content streams. The method is performed by processing logic that may comprise hardware (circuitry, dedicated logic, etc.), software (such as is run on a general purpose computer system or a dedicated machine), or a combination of both. In one implementation, the method is performed by user device 130 of FIG. 1, while in some other implementations, one or more blocks of FIG. 2 may be performed by another machine. For example, in various alternative implementations, the method can be performed by/at media capture device 120 and/or remote device(s) 180.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, a selection can be received. In certain implementations, such a selection can be of and/or correspond to one or more phenomena. Examples of such phenomena include but are not limited to one or more inputs that can be received from one or more sensors (such as sensors 150 as depicted in FIG. 1), as well as patterns, changes, rates of change, and/or meeting, exceeding, and/or falling below various thresholds, etc. that can be observed and/or identified with respect to such inputs. By way of illustration, changes in inputs received from an altimeter can reflect changes in altitude, changes in GPS coordinates (and/or accelerometer inputs) can reflect acceleration and/or speed, etc., each of which should be understood to constitute a 'phenomenon' as referenced herein (it should also be understood that a combination or composite of two or more inputs and/or input patterns—e.g., concurrent or correlated changes in location and changes in altitude—can also be a phenomena as described and referenced herein). Moreover, in certain implementations such a selection can be received with respect to one or more remote devices (such as remote devices 180 as depicted in FIG. 1). That is, it can be appreciated that different viewers may have different interests with respect to the types of videos/video streams they are interested in watching. For example, while one viewer may be interested in viewing videos of skydiving, another user may be interested in viewing car racing videos, etc. As such, different viewers (such as those associated with respective remote devices 180) can provide one or more selections that can define/dictate the types of phenomena that may characterize media content (e.g., video content) that the viewer is interested in. For example, one user may define or select to be presented (or to be notified of the availability of) a video stream that is being captured while the elevation associated with such a stream can be determined to be changing at a rate of 250 feet per second or faster (reflecting, for example, that such video is likely to be captured while skydiving), while another user may define or select to be presented (or to be notified of the availability of) a video stream that is being captured while the location change associated with such a stream can be determined to be changing at a rate of 50 miles per hour or greater (reflecting, for example, that such video is likely to be captured while driving). As noted, such a selection can be provided by the viewer to remote device 180 which can, in turn, transmit the selection (via network 110) to user device 130, and can be received by the user device. In one aspect, block 210 is performed by content correlation engine 140.

At block 220, one or more inputs can be processed. As noted, examples of such inputs include but are not limited to inputs originating from various sensors (such as sensors 150 of user device 130), though it should be understood that, in certain implementations, such inputs may originate from other sources (e.g., by processing video content in order to identify various indicators present therein). In doing so, an incidence of one or more phenomena can be identified. As noted, examples of such phenomena include but are not limited to meeting, exceeding, and/or falling below one or more input thresholds, various input patterns (e.g., an acceleration or deceleration pattern), etc., each of which can correspond to various occurrences or events (e.g., falling, driving, biking, skiing, etc.) that may coincide with the capture of a content stream (e.g., a video stream), such as by media capture device 120 (which, as noted, may be connected to user device 130 via a communication interface 160). In one aspect, block 220 is performed by content correlation engine 140.

Figure 3:
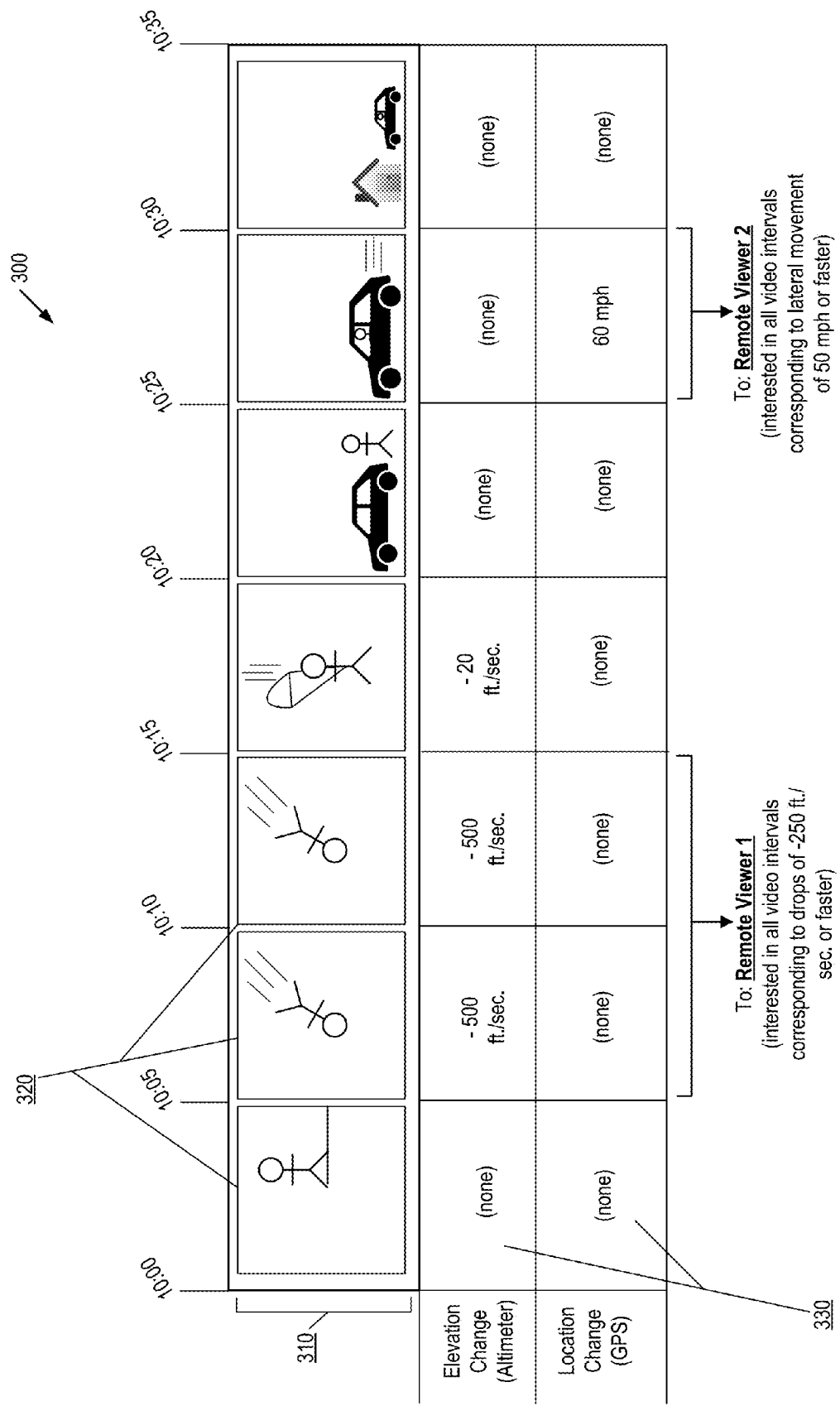
FIG. 3 depicts an exemplary chart depicting a content stream and various phenomena, in accordance with one implementation of the present disclosure.

By way of illustration, FIG. 3 depict an exemplary chart depicting the capture of a content stream 310, as well as incidences of various phenomena 330 (here, rates of change in elevation and in speed/location, as shown) that can be identified during the course of the stream.

At block 230, a content stream can be requested. In certain implementations, such a content stream can be requested from a media capture device. Moreover, in certain implementations, such a content stream can be requested device based on an identification of one or more phenomena (such as the phenomena identified at block 220). That is, it can be appreciated that while in certain implementations the various devices can be configured such that all of the content captured by media capture device 120 is transmitted/streamed to user device 130, such a configuration may entail considerable resources/overhead (e.g., processing resources, additional battery drain, etc.), particularly in a scenario in which only a subset of the entire media stream (e.g., certain chronological intervals) is actually of interest to a particular viewer. For example, a viewer (e.g., associated with a remote device 180) may be interested in viewing the 'freefall' portion of a skydive (characterized by a relatively rapid rate of change in altitude), but have little or no interest in viewing the portion of the media stream depicting the period after the skydiver's parachute has been opened (characterized by a relatively slower rate of change in altitude). Accordingly, in certain implementations, the referenced phenomena (which can be identified, for example, at user device 130) may serve to trigger or initiate a request for the media stream that corresponds to such phenomena (e.g., from media capture device 120). In doing so, those intervals of the media stream that correspond to the referenced phenomena (e.g., the 'freefall' portion of a skydive) can be requested from the media capture device, while other intervals (which do not correspond to such phenomena) will not be requested. In one aspect, block 230 is performed by content correlation engine 140.

At block 240, a content stream can be received. In certain implementations, such a content stream can be received from a media capture device (such as media capture device 120 as depicted in FIG. 1). For example, as noted, in certain implementations media capture device 120 (e.g., an external/peripheral video camera) can be connected/coupled to user device 130, and can be configured to transmit/stream media content (e.g., a continuous video stream) to the user device. Moreover, in certain implementations such a content stream can be received from the media capture device in response a request for the content stream (e.g., at block 230). That is, as noted, in certain implementations the user device may initiate a request for the media stream from media capture device 120, and such a media stream can be received (e.g., by the user device) in response to such a request. Moreover, as has also been noted, such a request may be triggered or initiated upon identifying/determining (e.g., by user device 130) an incidence of one or more phenomena (e.g., based on one or more sensor inputs received by the user device, reflecting, for example, changes in altitude, speed, etc.). In one aspect, block 240 is performed by content correlation engine 140.

It should also be noted that, in certain implementations, the referenced content stream can be received via a particular communication interface (and subsequently transmitted via another communication interface, such as is described herein and in relation to block 280). For example, as depicted in FIG. 1, user device 130 may receive a content stream (e.g., a video stream) from media capture device 120 via communication interface 160A (e.g., a WiFi adapter), and may transmit content stream(s) to network 110/remote devices 180 via communication interface 160N (e.g., a 3G/4G cellular radio) (e.g., substantially in real-time). In doing so, the content stream can both be received (e.g., from media capture device 120) and transmitted (e.g., to remote device 180, via network 110) simultaneously, without each operation compromising the bandwidth and/or resources of the other.

At block 250, the content stream (such as the content stream received at block 240) can be processed. In doing so, one or more phenomena can be identified, such as within the content stream. For example, in certain implementations, in lieu of and/or in addition to identifying various phenomena based on inputs received (such as from sensors 150), the content stream itself (e.g., the video and/or audio content that it contains) can also be processed/analyzed (e.g., using one or more audio and/or image processing techniques, such as are known to those of ordinary skill in the art) in order to identify such phenomena within the content stream. For example, in certain implementations the referenced content stream can be processed to identify one or more indicators within the content stream, such as indicators that may reflect that the camera is moving at (or above) a certain rate of speed (e.g., the rate at which the scenery perceived by the camera is changing). By way of further example, in certain implementations the audio track of the referenced content stream can be processed to identify various indicators (e.g., certain frequencies, background noise, engine noise, etc.) that may also constitute such phenomena. In one aspect, block 250 is performed by content correlation engine 140.

At block 260, one or more chronological intervals of the content stream (such as those intervals identified at block 250) can be correlated with one or more inputs (such as those inputs processed at block 220). As noted, in certain implementations such inputs can originate from one or more sensors (e.g., accelerometer, GPS receiver, gyroscope, microphone, altimeter, compass, pressure sensor, etc.). For example, each of the intervals 320 of video stream 310 (as depicted in FIG. 3) can be correlated with respective inputs that are received/identified synchronously (e.g., at the same time as such interval is captured). In one aspect, block 260 is performed by content correlation engine 140.

Moreover, in certain implementations a composite of the content stream and one or more inputs (such as those inputs processed at block 220) can be generated. By way of illustration, in certain implementations some (or all) of the inputs originating from various sensors (such as those inputs processed at block 220) and/or phenomena (such as are described herein) can be encoded or otherwise stored together/associated with the corresponding content stream (e.g., as metadata). For example, with respect to video stream 310 (as depicted in FIG. 3), some (or all) of the inputs perceived during the capture of the stream (e.g., inputs originating from an accelerometer, GPS receiver, microphone, etc., of a user device that may be connected or coupled to the media capture device that is capturing the stream), as well as phenomena that may correspond to such inputs (e.g., a rate of change with respect to such inputs, such as a rate of change in elevation, speed, etc., as described herein) can be encoded or otherwise stored with the media stream/content itself, thereby creating a composite of the media stream and corresponding inputs perceived concurrent with the capture of the stream. It should be understood that, in certain implementations, the referenced inputs/phenomena are encoded/stored/associated in a manner that reflects their correspondence with respective chronological intervals of the content stream. Thus, those inputs (and/or phenomena) received/perceived during one time interval can be stored or associated with an interval of the content stream captured during the same interval, while inputs/phenomena received/perceived during another time interval can be stored or associated with an interval of the content stream captured during that time interval. In doing so, the referenced composite content stream (which, as noted, incorporates or otherwise includes the referenced inputs/phenomena) can be subsequently processed, presented, etc. (e.g., by a third party) in a manner that accounts for the referenced inputs/phenomena. For example, media content (e.g., video) of the referenced stream can be subsequently played back together with an overlay which can depict or otherwise indicate the various inputs/phenomena that correspond to the interval being played. In doing so, the viewer can gain a better appreciation for the visual experience that accompanies various phenomena (e.g., falling at a particular rate, traveling at a particular speed, etc.).

At block 270, one or more inputs can be processed. In doing so, an incidence of one or more phenomena can be identified. For example, as described herein, various inputs received by the user device 130 can be processed to identify trends, patterns, rates of change, etc., with respect to the received inputs. By way of illustration, FIG. 3 depicts various phenomena 330 that can be identified based on the inputs received from various sensors. For example, it can be appreciated that by processing several altimeter inputs (reflecting the altitude of the device at a given moment in time) received over a particular time interval, the change in elevation of the device can be computed (e.g., −500 feet per second during the interval of 10:05-10:10), and by processing several GPS receiving inputs (corresponding to the geographical coordinates of the device at a moment in time) received over a particular time interval, the (lateral) speed of the device can be computed (e.g., 60 miles per hour during the interval of 10:25-10:30), such as in a manner known to those of ordinary skill in the art. In one aspect, block 270 is performed by content correlation engine 140.

At block 280, one or more chronological intervals of the content stream can be selected. In certain implementations, such chronological intervals can correspond to one or more phenomena (such as those phenomena identified at block 270). Moreover, in certain implementations, such selected intervals of the content stream can be transmitted, such as to one or more remote devices (e.g., substantially in real-time). Additionally, in certain implementations, such intervals of the content stream can be selected and/or transmitted based on and/or in response to an identification of an incidence of the one or more phenomena (such as at block 270). Additionally, in certain implementations the chronological interval(s) of the content stream that correspond to particular phenomena can be transmitted to particular remote device(s), based on the identification of the incidence of the one or more phenomena (such as at block 270) as well as the selection of such phenomena by/with respect to the one or more remote devices (such as at block 210). In one aspect, block 280 is performed by content correlation engine 140.

For example, as depicted in FIG. 3, intervals 320 of video stream 310 can be correlated with respective synchronous phenomena 330. By way of illustration, it can be appreciated that the video interval corresponding to 10:05-10:15 corresponds to a phenomenon reflecting a −500 feet per second change in elevation, while the video interval corresponding to 10:25-10:30 corresponds to a phenomenon reflecting a location change (that is, speed) at a rate of 60 miles per hour. Accordingly, in a scenario in which one remote device 180 (e.g., a remote device corresponding to 'Remote Viewer 1') has requested/selected to receive content intervals that correspond to drops (that is, changes in altitude) of −250 feet per second or faster, while another remote device (e.g., a remote device corresponding to 'Remote Viewer 2') has requested/selected to receive content intervals that correspond to changes in lateral movement (that is, speed) of 50 miles per hour or faster, the 10:05-10:15 video interval can be transmitted to 'Remote Viewer 1,' and the 10:25-10:30 video interval can be transmitted to 'Remote Viewer 2' (e.g., substantially in real-time). It can be further appreciated that the 10:00-10:05, 10:20-10:25, and 10:30-10:35 video intervals, which do not correspond to phenomena selected by any user, may thus not be transmitted by user device 130 (e.g., in order to conserve bandwidth and/or other resources).

Figure 4:
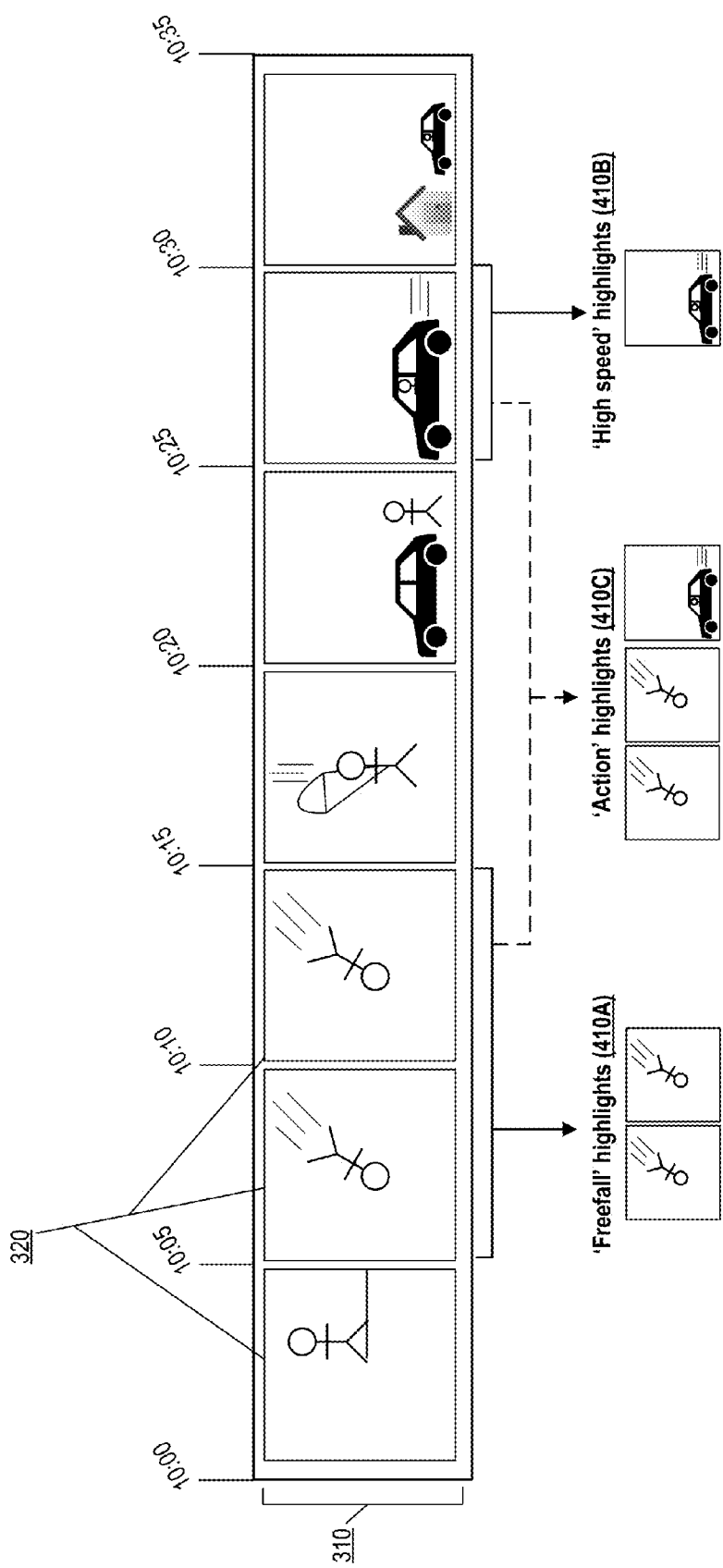
FIG. 4 depicts an exemplary content stream, in accordance with one implementation of the present disclosure.

Moreover, in certain implementations a modified content stream can be generated. In certain implementations, such a modified content stream can be generated based on one or more chronological intervals of the content stream that correspond to one or more phenomena (such as those phenomena identified at block 270). For example, FIG. 4 depicts an exemplary content stream 310 (comparable to the content stream depicted in FIG. 3 and described herein) having various intervals 320. It can be appreciated that, in certain scenarios, despite the fact that the entire content stream was captured/recorded, only certain intervals may be of interest or significance (e.g., to a particular user or viewer). Accordingly, in certain implementations the technologies described herein can be configured to modify, edit, etc., the referenced content stream in a manner that selects those intervals that correspond to particular phenomena.

By way of illustration, a user, viewer, video editor, etc., may define or otherwise dictate that he/she is interested in those intervals of the media content stream that correspond to 'freefall' (e.g., changes in altitude of −250 feet per second or faster) (or, conversely, that the user is not interested in those intervals that do not correspond to such phenomena). Accordingly, a modified content stream 410A (as depicted in FIG. 4) can be generated (e.g., by creating a new content stream/file that is only made up of the interval(s) that correspond to the referenced phenomena or by deleting or otherwise removing those other intervals in the original content stream 310 that do not correspond to such phenomena). By way of further illustration, a user, editor, etc., may define that he/she is interested in those intervals of the media content stream that correspond to 'high speed' (e.g., faster than 50 miles per hour, and a modified content stream 410B (as depicted in FIG. 4) can be generated. By way of yet further illustration, in certain implementations multiple criteria or phenomena can be accounted for in generating such modified content streams. For example, in a scenario in which a user, editor, etc., is interested in selecting those intervals of the media content stream that correspond to multiple different types of 'action' sequences (e.g., 'freefall,' 'high speed,' etc.) multiple phenomena can be accounted for in generating a modified content stream (410C, as depicted in FIG. 4).

It should be noted that while in certain implementations the content stream may be modified, edited, etc., in an automated fashion (e.g., by generating a modified content stream based on various phenomena, such as is described herein), in other implementations the referenced phenomena can be utilized and/or accounted for in identifying or highlighting various intervals of a media stream in scenarios in which various aspects of the modification of the content stream are performed manually and/or in response to user/editor feedback. For example, in a scenario in which an editor is manually editing a media stream, the technologies and techniques described herein can be utilized to highlight or identify various intervals of the stream (e.g., those corresponding to 'freefall,' 'high speed,' etc.) and enable the editor to identify or select (or, alternatively, to delete) those intervals from the media stream.

Figure 5:
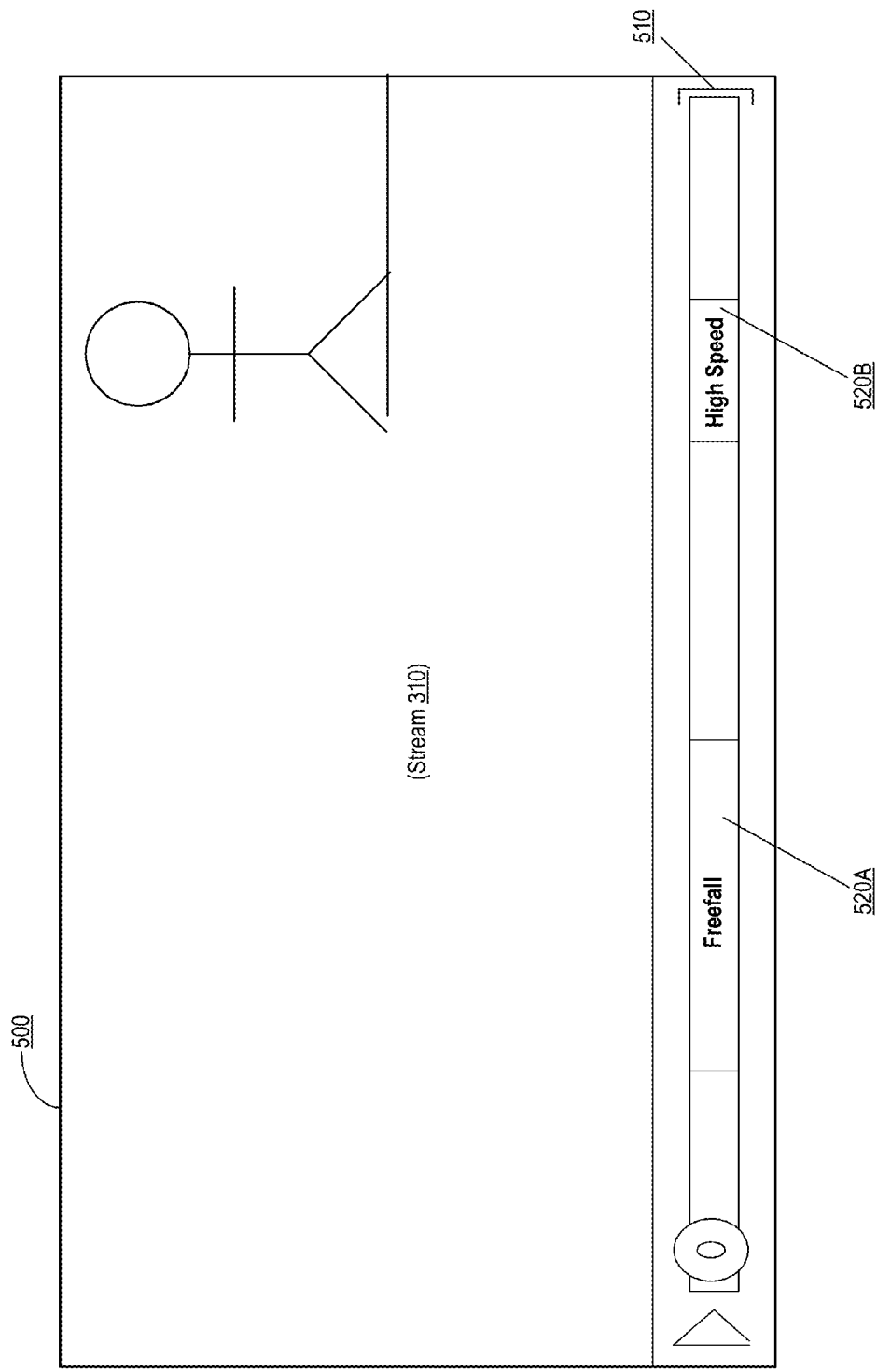
FIG. 5 depicts an exemplary media player in accordance with one implementation of the present disclosure.
Figure 6:
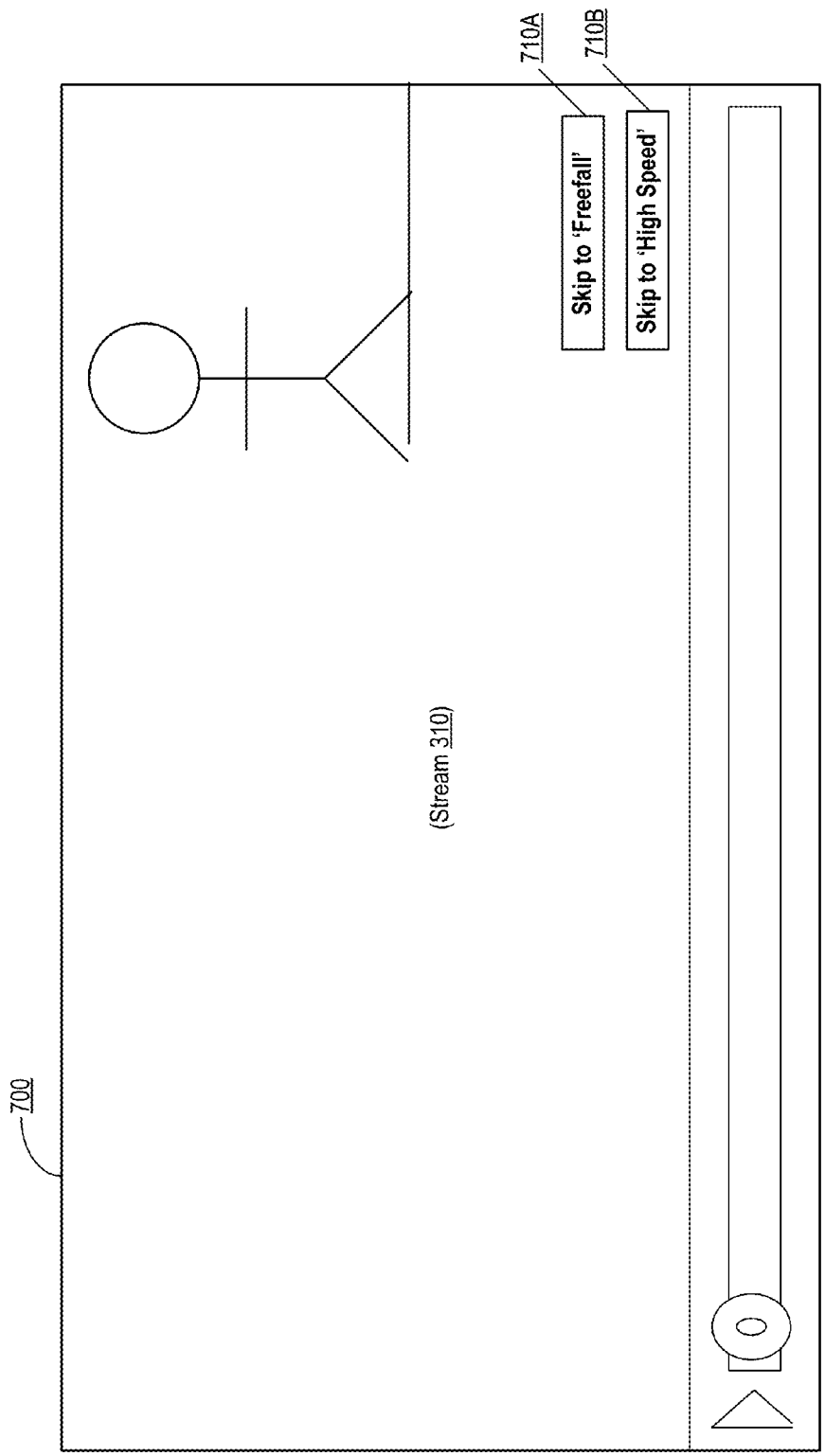
FIG. 6 depicts an exemplary media player in accordance with one implementation of the present disclosure.

Additionally, in certain implementations, in lieu of and/or in addition to modifying a content stream based on chronological intervals of the content stream that correspond to various phenomena, such phenomena can be used or considered in presenting and/or enabling interaction with/navigation of the content stream. That is, having identified or associated one or more intervals of a content stream with various phenomena, various aspects of the interface(s) that may be used to view or interact with the stream can be modified based on the referenced phenomena. For example, FIG. 5 depicts an exemplary media player 500 (e.g., a video player embedded within a webpage, a standalone video player application, etc.) that is playing content video stream 310 (such as is also depicted in FIGS. 3 and 4). As shown in FIG. 5, the navigation bar 510 of the media player can be modified, such as in order to highlight the intervals of the stream 310 that correspond to various phenomena (e.g., interval 520A, corresponding to 'freefall' and interval 520B, corresponding to 'high speed'). In doing so, a viewer of the video stream 310 can readily identify the various intervals of the stream that correspond to different phenomena, and can navigate to such intervals (e.g., via interaction with navigation bar 510). By way of further example, FIG. 6 depicts an exemplary media player 700 that is playing content video stream 310 (such as is also depicted in FIGS. 3-5). As shown in FIG. 6, the interface of the media player can be modified, such as by overlaying one or more selectable controls (e.g., buttons 710A and 710B) which may be associated with various intervals of the stream 310 that correspond to various phenomena (e.g., button 710A, associated with an interval of the stream corresponding to 'freefall' and button 710B, associated with an interval of the stream corresponding to 'high speed'). Upon receiving a selection of such control(s), the media player can skip to the associated interval. In doing so, a viewer of the video stream 310 can readily navigate to the various intervals of the stream that correspond to different phenomena.

Moreover, as noted above with respect to block 240, in certain implementations the chronological intervals of the content stream that correspond to one or more phenomena can be transmitted to one or more remote devices via a second communication interface.

At block 290, one or more chronological intervals of the content stream (such as those selected at block 280) can be presented. In certain implementations, such intervals can be presented based on one or more phenomena (such as those phenomena identified at block 270). For example, having generated a composite content stream (which, as noted, can include or incorporate the various inputs/phenomena, such as with respect to various intervals of the content stream to which they correspond), such a composite stream can be further utilized to enhance the presentation of the content stream (and/or intervals thereof) based on the referenced inputs/phenomena. By way of illustration, the referenced composite content stream can be provided to and/or received by one or more simulators or simulation systems/devices. Such simulators/systems/devices can utilize the composite stream to present the media content (e.g., the captured video) concurrent with a simulation of one or more of the phenomena that are determined to have occurred while the video was being captured. For example, a skydiving simulator can present a video stream that reflects visual aspects of a skydive experience while also simulating various other aspects of the experience (e.g., freefall, etc.) in conjunction with the visual presentation (e.g., aspects of the experience that correspond to the interval of the video currently being played). By way of further example, a driving simulator can present a video stream that reflects visual aspects of a high speed driving experience while also simulating various other aspects of the experience (e.g., acceleration, traveling at certain speeds, etc.) in conjunction with the visual presentation. In doing so, in certain implementations various commands may be generated. Such commands can be generated, for example, based on the one or more phenomena (such as those phenomena identified at block 270). For example, having identified the referenced phenomena, various commands (such as in a format or configuration that can be provided to and/or received by a particular simulator, simulation device, etc.) can be generated, and such commands can also be correlated with corresponding intervals of the media stream, thereby enabling the composite stream to be utilized in recreating various aspects of the experience captured in the stream via such simulators/devices. In one aspect, block 290 is performed by content correlation engine 140.

At this juncture, it should be noted that in other implementations such the various technologies described herein can also be utilized to curate content from multiple content streams. For example, in a scenario in which multiple users are capturing media content, utilizing the techniques described herein, selections of various phenomena can be utilized to identify which intervals of the referenced multiple content streams are likely to be of interest to various viewers (and, conversely, which intervals are unlikely to be of interest). For example, in many instances, those content intervals that correspond to relatively high rates of change (e.g., rapid changes in altitude, high speeds, etc.) are relatively more likely to be of interest to many viewers (or to certain types of viewers), as opposed to those intervals that correspond to relatively lower rates of change.

It should also be noted that while the technologies described herein are illustrated primarily with respect to content/media streaming, the described technologies can also be implemented in any number of additional or alternative settings or contexts and towards any number of additional objectives.

Figure 7:
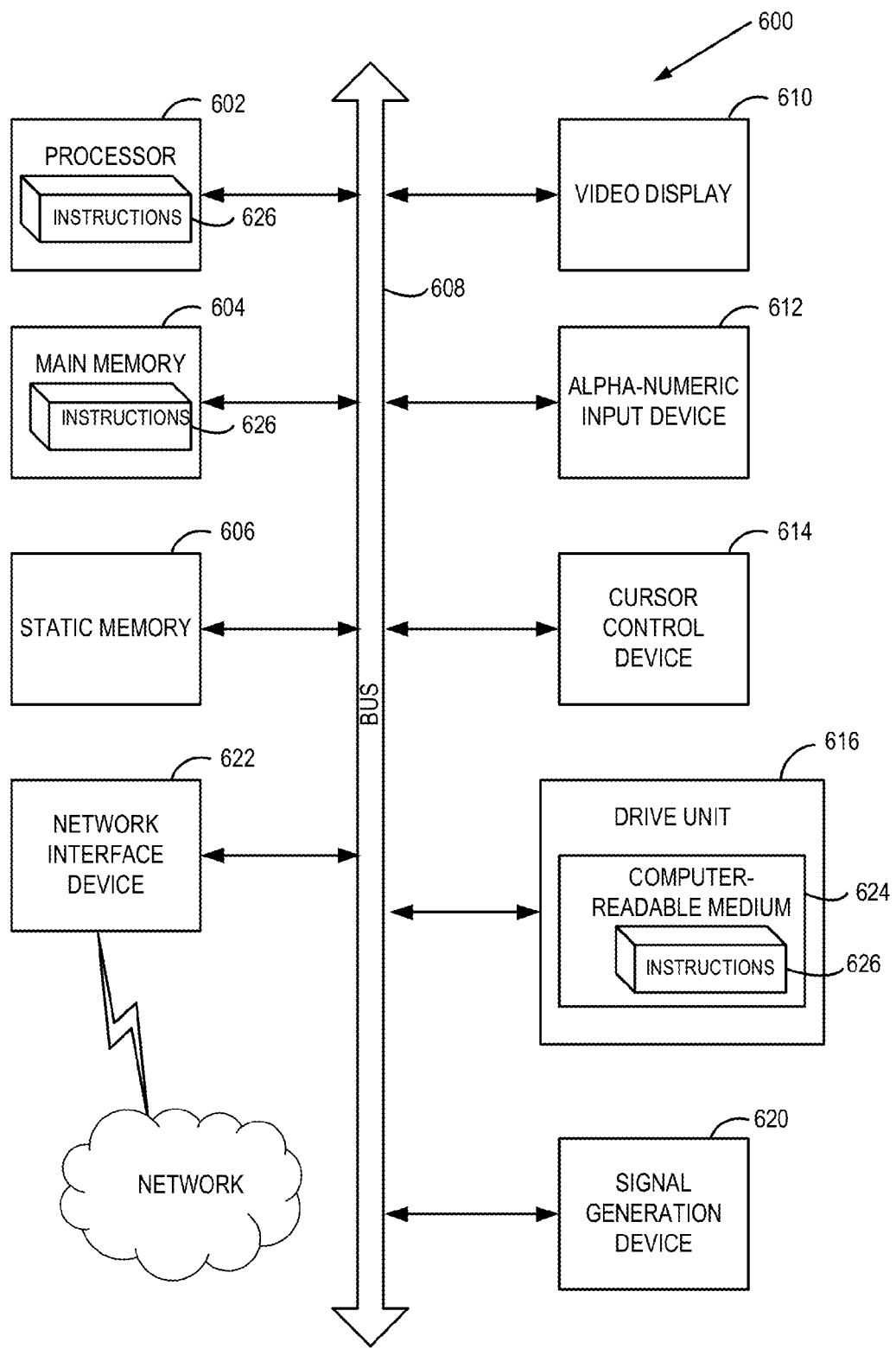
FIG. 7 depicts a block diagram of an illustrative computer system operating in accordance with aspects and implementations of the present disclosure.

FIG. 7 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "requesting," "correlating," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
   receiving, with respect to a remote device, a selection of one or more first phenomena and one or more second phenomena;
   receiving a content stream from a media capture device;
   correlating, by a processing device, one or more chronological intervals of the content stream with one or more first inputs, the one or more first inputs originating from one or more sensors;

processing the one or more first inputs to identify, with respect to respective chronological intervals of the content stream, respective incidences of the one or more first phenomena and the one or more second phenomena; and based on (a) the selection of the one or more first phenomena and the one or more second phenomena with respect to the remote device and (b) an identification of the respective incidences of the one or more first phenomena and the one or more second phenomena, generating one or more first commands, the one or more first commands corresponding to a representation of the one or more first phenomena;

generating one or more second commands, the one or more second commands corresponding to a representation of the one or more second phenomena;

correlating the one or more first commands with the one or more chronological intervals of the content stream that correspond to the one or more first phenomena;

correlating the one or more second commands with the one or more chronological intervals of the content stream that correspond to the one or more second phenomena;

providing, to the remote device, the one or more first commands concurrent with a presentation of the one or more chronological intervals of the content stream that correspond to the one or more first phenomena; and providing, to the remote device, the one or more second commands concurrent with a presentation of the one or more chronological intervals of the content stream that correspond to the one or more second phenomena.

2. The method of claim 1, further comprising requesting the content stream from the media capture device.

3. The method of claim 1, further comprising:
based on the identification of the one or more second phenomena, requesting the content stream from the media capture device.

4. The method of claim 3, wherein receiving the content stream comprises receiving the content stream from the media capture device in response to the requesting.

5. The method of claim 1, wherein receiving the content stream comprises receiving the content stream via a first communication interface.

6. The method of claim 1, wherein the one or more sensors comprise at least one of: a global positioning system (GPS) receiver, an accelerometer, a gyroscope, an altimeter, or a compass.

7. The method of claim 1, further comprising processing the content stream to identify the one or more first phenomena within the content stream.

8. The method of claim 7, wherein processing the content stream comprises processing the content stream to identify one or more indicators within the content stream.

9. The method of claim 1, wherein correlating one or more chronological intervals of the content stream comprises generating a composite of the content stream and the one or more first inputs.

10. The method of claim 1, further comprising presenting at least one of the one or more selected chronological intervals based on the one or more first phenomena.

11. The method of claim 1, further comprising:
based on (a) the selection of the one or more first phenomena and the one or more second phenomena with respect to the remote device and (b) the identification of the respective incidences of the one or more first phenomena and the one or more second phenomena, modifying a first segment of a navigation element included in a content presentation interface within which the content stream is presented, the navigation element corresponding to the duration of the content stream and the first segment corresponding to the one or more chronological intervals of the content stream that correspond to the one or more first phenomena, and modifying a second segment of the navigation element included in the content presentation interface within which the content stream is presented, the second segment corresponding to the one or more chronological intervals of the content stream that correspond to the one or more second phenomena.

12. The method of claim 1, further comprising:
selecting at least one of the one or more chronological intervals of the content stream that correspond to the one or more first phenomena or the one or more second phenomena;

removing at least one of the one or more chronological intervals of the content stream that do not correspond to the one or more first phenomena or the one or more second phenomena;

generating a modified content stream that includes the at least one of the one or more chronological intervals of the content stream that correspond to the one or more first phenomena or the one or more second phenomena and does not include the at least one of the one or more chronological intervals of the content stream that do not correspond to the one or more first phenomena; and transmitting the modified content stream to the remote device.

13. The method of claim 12, wherein selecting at least one of the one or more chronological intervals comprises transmitting, to one or more remote devices via a second communication interface, at least one of the one or more chronological intervals of the content stream that correspond to the one or more first phenomena.

14. A system comprising:
a memory; and
a processing device, operatively coupled to the memory, to:
receive, with respect to a remote device, a selection of one or more first phenomena and one or more second phenomena;

receive a content stream from a media capture device;

correlate one or more chronological intervals of the content stream with one or more first inputs, the one or more first inputs originating from one or more sensors;

process the one or more first inputs to identify, with respect to respective chronological intervals of the content stream, respective incidences of the one or more first phenomena and the one or more second phenomena; and based on (a) the selection of the one or more first phenomena and the one or more second phenomena with respect to the remote device and (b) an identification of the respective incidences of the one or more first phenomena and the one or more second phenomena, generate one or more first commands, the one or more first commands corresponding to a representation of the one or more first phenomena;

generate one or more second commands, the one or more second commands corresponding to a representation of the one or more second phenomena;

correlate the one or more first commands with the one or more chronological intervals of the content stream that correspond to the one or more first phenomena;

correlate the one or more second commands with the one or more chronological intervals of the content stream that correspond to the one or more second phenomena;

provide, to the remote device, the one or more first commands concurrent with a presentation of the one or more chronological intervals of the content stream that correspond to the one or more first phenomena; and provide, to the remote device, the one or more second commands concurrent with a presentation of the one or more chronological intervals of the content stream that correspond to the one or more second phenomena.

15. The system of claim 14, wherein the processing device is further to:

based on the identification of the one or more second phenomena, request the content stream from the media capture device.

16. The system of claim 14, wherein to receive the content stream is to receive the content stream via a first communication interface.

17. The system of claim 14, wherein the processing device is further to process the content stream to identify (a) the one or more first phenomena within the content stream and (b) one or more indicators within the content stream.

18. The system of claim 14, wherein to correlate one or more chronological intervals of the content stream is to generate a composite of the content stream and the one or more first inputs.

19. The system of claim 14, wherein the processing device is further to present at least one of the one or more selected chronological intervals based on the one or more first phenomena.

20. The system of claim 19, wherein to present the at least one of the one or more selected chronological intervals is to generate one or more commands based on the one or more first phenomena.

21. The system of claim 14, wherein the processing device is further to:

based on (a) the selection of the one or more first phenomena and the one or more second phenomena with respect to the remote device and (b) the identification of the respective incidences of the one or more first phenomena and the one or more second phenomena, modify a first segment of a navigation element included in a content presentation interface within which the content stream is presented, the navigation element corresponding to the duration of the content stream and the first segment corresponding to the one or more chronological intervals of the content stream that correspond to the one or more first phenomena, and modify a second segment of the navigation element included in the content presentation interface within which the content stream is presented, the second segment corresponding to the one or more chronological intervals of the content stream that correspond to the one or more second phenomena.

22. The system of claim 14, wherein the processing device is further to:

remove at least one of the one or more chronological intervals of the content stream that do not correspond to the one or more first phenomena or the one or more second phenomena;

generate a modified content stream that includes at least one of the one or more chronological intervals of the content stream that correspond to the one or more first phenomena or the one or more second phenomena and does not include the at least one of the one or more chronological intervals of the content stream that do not correspond to the one or more first phenomena; and transmit the modified content stream to the remote device.

23. A non-transitory computer readable medium having instructions stored thereon that, when executed by a processing device, cause the processing device to:

receive, with respect to a remote device, a selection of one or more first phenomena and one or more second phenomena;

receive a content stream from a media capture device;

correlate one or more chronological intervals of the content stream with one or more first inputs, the one or more first inputs originating from one or more sensors;

process the composite content stream to identify, with respect to respective chronological intervals of the composite content stream, respective incidences of the one or more first phenomena and the one or more second phenomena; and based on (a) an identification of the respective incidences of the one or more first phenomena and the one or more second phenomena and (b) the selection of the one or more first phenomena and the one or more second phenomena with respect to the remote device, generate one or more first commands, the one or more first commands corresponding to a representation of the one or more first phenomena;

generate one or more second commands, the one or more second commands corresponding to a representation of the one or more second phenomena;

correlate the one or more first commands with the one or more chronological intervals of the content stream that correspond to the one or more first phenomena;

correlate the one or more second commands with the one or more chronological intervals of the content stream that correspond to the one or more second phenomena;

provide, to the remote device, the one or more first commands concurrent with a presentation of the one or more chronological intervals of the content stream that correspond to the one or more first phenomena; and provide, to the remote device, the one or more second commands concurrent with a presentation of the one or more chronological intervals of the content stream that correspond to the one or more second phenomena.

24. The non-transitory computer readable medium of claim 23, further comprising instructions that, when executed by the processing device, cause the processing device to:

based on (a) the selection of the one or more first phenomena and the one or more second phenomena with respect to the remote device and (b) the identification of the respective incidences of the one or more first phenomena and the one or more second phenomena, modify a first segment of a navigation element included in a content presentation interface within which the composite content stream is presented, the navigation element corresponding to the duration of the composite content stream and the first segment corresponding to the one or more chronological intervals of the composite content stream that correspond to the one or more first phenomena, and modify a second segment of the navigation element included in the content presentation interface within which the composite content stream is presented, the second segment corresponding to the one or more chronological intervals of the content stream that correspond to the one or more second phenomena.

25. The non-transitory computer readable medium of claim 23, further comprising instructions that, when executed by the processing device, cause the processing device to:
generate a modified content stream that includes at least one of the one or more chronological intervals of the content stream that correspond to the one or more first phenomena or the one or more second phenomena and does not include at least one of the one or more chronological intervals of the content stream that do not correspond to the one or more first phenomena; and
transmit the modified content stream to the remote device.

* * * * *